(12) United States Patent
Yang et al.

(10) Patent No.: US 11,538,273 B2
(45) Date of Patent: Dec. 27, 2022

(54) INTEGRATED PHOTO-SENSING DETECTION DISPLAY APPARATUS AND METHOD OF FABRICATING INTEGRATED PHOTO-SENSING DETECTION DISPLAY APPARATUS

(71) Applicant: BOE Technology Group Co., Ltd., Beijing (CN)

(72) Inventors: Shengji Yang, Beijing (CN); Xue Dong, Beijing (CN); Xiaochuan Chen, Beijing (CN); Hui Wang, Beijing (CN); Pengcheng Lu, Beijing (CN); Kuanta Huang, Beijing (CN); Zengqiang Zheng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 273 days.

(21) Appl. No.: 16/626,779

(22) PCT Filed: Dec. 3, 2018

(86) PCT No.: PCT/CN2018/118946
§ 371 (c)(1),
(2) Date: Dec. 26, 2019

(87) PCT Pub. No.: WO2020/113380
PCT Pub. Date: Jun. 11, 2020

(65) Prior Publication Data
US 2021/0334509 A1    Oct. 28, 2021

(51) Int. Cl.
*G06V 40/13* (2022.01)
*G02B 5/18* (2006.01)
(Continued)

(52) U.S. Cl.
CPC ....... *G06V 40/1324* (2022.01); *G02B 5/1828* (2013.01); *G02F 1/133504* (2013.01);
(Continued)

(58) Field of Classification Search
CPC ............ G06K 9/0004; G06K 9/00046; G02B 5/1828; G02B 5/1866; G02B 27/4205; G02F 1/133504
See application file for complete search history.

(56) References Cited

U.S. PATENT DOCUMENTS

| | | | |
|---|---|---|---|
| 2008/0218862 A1* | 9/2008 | Kekas | G02F 1/133504 359/573 |
| 2016/0020422 A1* | 1/2016 | Kim | H01L 29/45 257/40 |

(Continued)

FOREIGN PATENT DOCUMENTS

| | | | | |
|---|---|---|---|---|
| CN | 106298859 A | * | 1/2017 | ........... G06K 9/0004 |
| CN | 106980850 A | * | 7/2017 | ........... G06K 9/0008 |

*Primary Examiner* — Yuzhen Shen
(74) *Attorney, Agent, or Firm* — Intellectual Valley Law, P.C.

(57) ABSTRACT

An integrated photo-sensing detection display substrate. The integrated photo-sensing detection display substrate includes a base substrate; a plurality of light emitting elements on the base substrate and configured to emit light, a portion of the light being totally reflected by a surface thereby forming totally reflected light; an addressable diffraction grating layer on a side of the base substrate away from the plurality of light emitting elements, and including a plurality of individually addressable diffraction regions, light diffraction respectively in the plurality of individually addressable diffraction regions being independently controllable; and a photosensor on a side of the addressable diffraction grating layer away from the base substrate and configured to detect light transmitted from one or more of (Continued)

the plurality of individually addressable diffraction regions, thereby detecting fingerprint information.

20 Claims, 11 Drawing Sheets

(51) Int. Cl.
*G02F 1/1335* (2006.01)
*G06F 21/32* (2013.01)
*G06F 21/84* (2013.01)
*H01L 27/146* (2006.01)

(52) U.S. Cl.
CPC .............. *G06F 21/32* (2013.01); *G06F 21/84* (2013.01); *G06V 40/1318* (2022.01); *H01L 27/14625* (2013.01); *G02B 2207/101* (2013.01)

(56) References Cited

U.S. PATENT DOCUMENTS

| 2017/0220844 | A1* | 8/2017 | Jones | A61B 5/1172 |
| 2017/0235153 | A1* | 8/2017 | Lee-Bouhours | G02B 27/42 |
| | | | | 359/571 |
| 2018/0089485 | A1* | 3/2018 | Bok | G06V 40/1306 |
| 2018/0321500 | A1* | 11/2018 | Chen | G02B 5/1819 |
| 2019/0156097 | A1* | 5/2019 | Liu | G06K 9/0004 |
| 2019/0272408 | A1* | 9/2019 | Ding | G06K 9/0004 |
| 2020/0160026 | A1* | 5/2020 | Chao | H01L 27/1463 |

\* cited by examiner

INTEGRATED PHOTO-SENSING DETECTION DISPLAY APPARATUS AND METHOD OF FABRICATING INTEGRATED PHOTO-SENSING DETECTION DISPLAY APPARATUS

CROSS-REFERENCE TO RELATED APPLICATION

This application is a national stage application under 35 U.S.C. § 371 of International Application No. PCT/CN2018/118946, filed Dec. 3, 2018, the contents of which are incorporated by reference in the entirety.

TECHNICAL FIELD

The present invention relates to photo-sensing detection technology, more particularly, to an integrated photo-sensing detection display apparatus and a method of fabricating an integrated photo-sensing detection display apparatus.

BACKGROUND

In recent years, various methods have been proposed in fingerprint and palm print recognition. Examples of optical method for recognizing fingerprint and palm print include total reflection method, light-path separation method, and scanning method. In a total reflection method, light from a light source such as ambient light enters into a pixel, and is totally reflected on the surface of a package substrate. When a finger or palm touches the display panel, the total reflection condition of the surface changes locally upon touch, leading to a disruption of the total reflection locally. The disruption of the total reflection results in a reduced reflection. Based on this principle, the ridge lines of a finger may be differentiated from the valley lines. Alternatively, fingerprint and palm print may be recognized by detecting changes in capacitance when a finger or palm touches the display panel.

SUMMARY

In one aspect, the present invention provides an integrated photo-sensing detection display substrate, comprising a base substrate; a plurality of light emitting elements on the base substrate and configured to emit light, a portion of the light being totally reflected by a surface thereby forming totally reflected light; an addressable diffraction grating layer on a side of the base substrate away from the plurality of light emitting elements, and comprising a plurality of individually addressable diffraction regions, light diffraction respectively in the plurality of individually addressable diffraction regions being independently controllable; and a photosensor on a side of the addressable diffraction grating layer away from the base substrate and configured to detect light transmitted from one or more of the plurality of individually addressable diffraction regions, thereby detecting fingerprint information.

Optionally, the photosensor has an area smaller than an area of the integrated photo-sensing detection display substrate; and the addressable diffraction grating layer is configured to form collimated light beams transmitting toward the photosensor respectively at different exit angles depending on a light exiting position on the addressable diffraction grating layer relative to the photosensor.

Optionally, the plurality of individually addressable diffraction regions comprises a first individually addressable diffraction region and a second individually addressable diffraction region; the first individually addressable diffraction region is configured to collimate light transmitted to the first individually addressable diffraction region to exit the first individually addressable diffraction region at a first exit angle toward the photosensor; the second individually addressable diffraction region is configured to collimate light transmitted to the second individually addressable diffraction region to exit the second individually addressable diffraction region at a second exit angle toward the photosensor; and the second exit angle and the first exit angle are different from each other.

Optionally, the integrated photo-sensing detection display substrate has a subpixel region and an inter-subpixel region; the integrated photo-sensing detection display substrate further comprises a light shielding layer between the plurality of light emitting elements and the base substrate configured to block at least a portion of diffusedly reflected light from passing through, the light shielding layer having a light path aperture in the inter-subpixel region allowing at least a portion of the totally reflected light to pass through thereby forming a signal-enriched light beam; the addressable diffraction grating layer is configured to at least partially collimate the signal-enriched light beam thereby forming a collimated light beam; and the photosensor is configured to detect the collimated light beam, thereby detecting fingerprint information.

Optionally, the light shielding layer has an area greater than an area of the subpixel region; and an orthographic projection of the light shielding layer on the base substrate covers an orthographic projection of the subpixel region on the base substrate.

Optionally, the integrated photo-sensing detection display substrate further comprises a plurality of thin film transistors configured to drive light emission of the plurality of light emitting elements; a respective one of the plurality of thin film transistors comprises a drain electrode; the light shield layer comprises a plurality of light shielding blocks spaced apart from each other; and a respective one of the plurality of light shielding blocks is electrically connected to the drain electrode of a respective one of the plurality of thin film transistors.

Optionally, the integrated photo-sensing detection display substrate further comprises a first insulating layer between the drain electrode and the light shield layer.

Optionally, a respective one of the plurality of light emitting elements comprises a first electrode electrically connected to the light shielding layer.

Optionally, the integrated photo-sensing detection display substrate further comprises a second insulating layer between the first electrode and the light shield layer.

Optionally, the second insulating layer extends into the light path aperture.

Optionally, the first electrode is made of a substantially transparent conductive material.

Optionally, the integrated photo-sensing detection display substrate further comprises a pixel definition layer defining a plurality of subpixel apertures; and the pixel definition layer has an inter-subpixel aperture in the inter-subpixel region allowing at least a portion of the totally reflected light to pass through sequentially the inter-subpixel aperture and the light path aperture.

Optionally, the inter-subpixel aperture is larger than the light path aperture; and an orthographic projection of the light shielding layer on the base substrate covers an orthographic projection of the pixel definition layer on the base substrate.

Optionally, the addressable diffraction grating layer is a nano-diffraction grating layer.

Optionally, the addressable diffraction grating layer is a liquid crystal diffraction grating layer.

Optionally, the integrated photo-sensing detection display substrate further comprises a light collimating film on a side of the addressable diffraction grating layer away from the photosensor.

In another aspect, the present invention provides an integrated photo-sensing detection display apparatus, comprising the integrated photo-sensing detection display substrate described herein or fabricated by a method described herein; a counter substrate facing the integrated photo-sensing detection display substrate; and a grating layer driver circuit configured to independently control light diffraction respectively in the plurality of individually addressable diffraction regions; wherein the plurality of light emitting elements are configured to emit light toward the counter substrate, a portion of the light being totally reflected by a surface of the counter substrate facing away the integrated photo-sensing detection display substrate thereby forming the totally reflected light.

Optionally, the grating layer driver circuit is configured to selectively switch on at least a first individually addressable diffraction region to diffract a portion of the totally reflected light to the photosensor, and selectively switch off at least a second individually addressable diffraction region so that substantially no light transmitted through the second individually addressable diffraction region.

Optionally, the integrated photo-sensing detection display apparatus further comprises a touch sensing driver circuit configured to detect a touch position in the integrated photo-sensing detection display apparatus; and wherein the grating layer driver circuit is configured to select the first individually addressable diffraction region and the second individually addressable diffraction region based on the touch position.

In another aspect, the present invention provides a method of driving photo-sensing detection in an integrated photo-sensing detection display substrate comprising a base substrate; a plurality of light emitting elements on the base substrate and configured to emit light, a portion of the light being totally reflected by a surface thereby forming totally reflected light; an addressable diffraction grating layer on a side of the base substrate away from the plurality of light emitting elements, and comprising a plurality of individually addressable diffraction regions, light diffraction respectively in the plurality of individually addressable diffraction regions being independently controllable; and a photosensor on a side of the addressable diffraction grating layer away from the base substrate and configured to detect light transmitted from one or more of the plurality of individually addressable diffraction regions, thereby detecting fingerprint information; wherein the method comprises selectively switching on at least a first individually addressable diffraction region to diffract a portion of the totally reflected light to the photosensor, and selectively switching off at least a second individually addressable diffraction region so that substantially no light transmitted through the second individually addressable diffraction region.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Accordingly, the present disclosure provides, inter alia, an integrated photo-sensing detection display apparatus and a method of fabricating an integrated photo-sensing detection display apparatus that substantially obviate one or more of the problems due to limitations and disadvantages of the related art. In one aspect, the present disclosure provides an integrated photo-sensing detection display apparatus. In some embodiments, the integrated photo-sensing detection display apparatus includes a counter substrate; and an array substrate facing the counter substrate. In some embodiments, the array substrate includes a base substrate, and a plurality of light emitting elements on the base substrate and configured to emit light toward the counter substrate, a portion of the light being totally reflected by a surface of the counter substrate facing away the array substrate thereby forming totally reflected light. The integrated photo-sensing detection display apparatus further includes an addressable diffraction grating layer on a side of the base substrate away from the plurality of light emitting elements, and including a plurality of individually addressable diffraction regions; a grating layer driver circuit configured to independently control light diffraction respectively in the plurality of individually addressable diffraction regions; and a photosensor on a side of the addressable diffraction grating layer away from the base substrate and configured to detect light transmitted from one or more of the plurality of individually addressable diffraction regions, thereby detecting fingerprint information.

Figure 1:
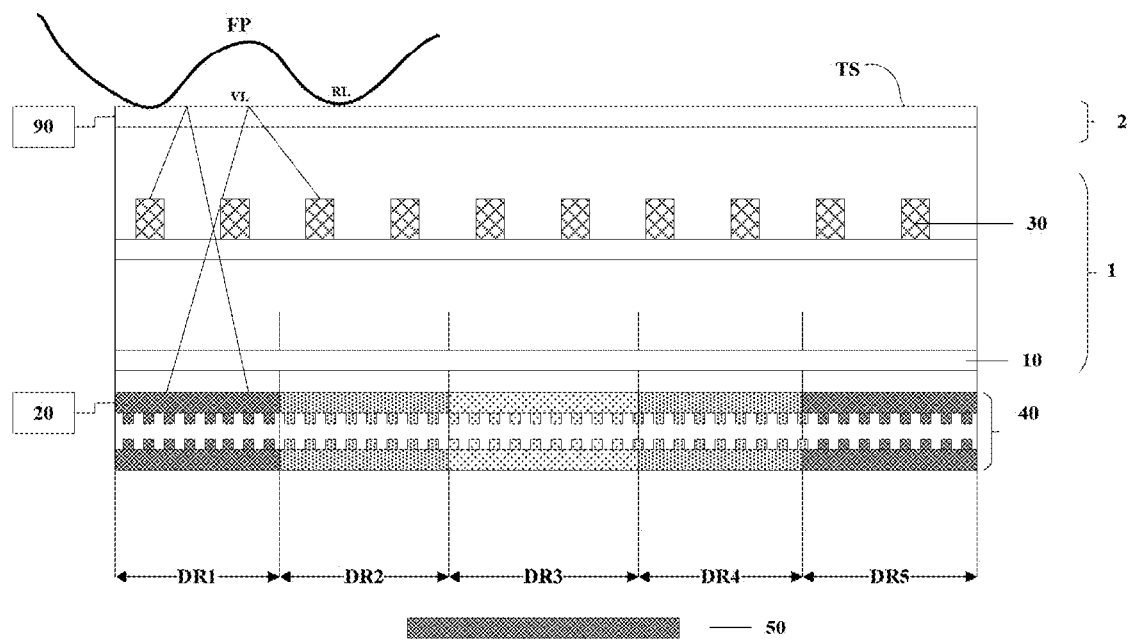
FIG. 1 is a schematic diagram illustrating the structure of an integrated photo-sensing detection display apparatus in some embodiments according to the present disclosure.

FIG. 1 is a schematic diagram illustrating the structure of an integrated photo-sensing detection display apparatus in some embodiments according to the present disclosure. The integrated photo-sensing detection display apparatus in some embodiments includes an array substrate 1 and a counter substrate 2 facing the array substrate 1. In some embodiments, the array substrate 1 includes a base substrate 10, and a plurality of light emitting elements 30 on the base substrate 10 and configured to emit light toward the counter substrate 2. A portion of the light being totally reflected by a surface TS of the counter substrate 2 facing away the array substrate 1 thereby forming totally reflected light. Various appropriate light emitting elements may be used in the present display substrate. Examples of appropriate light emitting elements include an organic light emitting diode, a quantum dots light emitting diode, and a micro light emitting diode.

The plurality of light emitting elements 30 are configured to emit light toward the counter substrate 2, e.g., for image display. As shown in FIG. 1, at least a portion of the light emitted from the plurality of light emitting elements 30 is reflected by, e.g., totally reflected by a surface TS of the counter substrate 2 facing away the array substrate 1 thereby forming totally reflected light. The surface TS is, for example, a touch surface on which a fingerprint touch occurs. When a finger (or palm) is placed on the side of the counter substrate 2 facing away the array substrate 1, a finger print FP (or a palm print) can be detected. As shown in FIG. 1, the finger print FP has a plurality of ridges lines RL and a plurality of valley lines VL. Light emitted from the plurality of light emitting elements 30 irradiates the plurality of valley lines VL and the plurality of ridge lines RL of the finger print FP (or the palm print). Due to the difference between the plurality of valley lines VL and the plurality of ridge lines RL in the reflection angle and the intensity of reflected light, the light projected onto a photosensor can produce different electrical currents, so that the plurality of valley lines VL and the plurality of ridge lines RL of the finger print FP (or the palm print) can be recognized.

In one example, light irradiates on one of the plurality of valley lines VL. The finger (or the palm) is not in touch with the screen surface (the side of the counter substrate 2 facing away the array substrate 1) in regions corresponding to the plurality of valley lines VL, total reflection conditions in these regions remain intact (for example, the medium on a side of the counter substrate 2 away from the array substrate 1 is air). Light irradiates on the surface TS of the counter substrate 2 facing away the array substrate 1 in the regions corresponding to the plurality of valley lines VL, and (at least a portion of) light is totally reflected by the surface TS of the counter substrate 2 facing away the array substrate 1. The light totally reflected by the surface TS of the counter substrate 2 facing away the array substrate 1 in the regions corresponding to the plurality of valley lines VL is detected.

In another example, light irradiates on one of the plurality of ridge lines RE The finger (or the palm) is in touch with the screen surface (the side of the counter substrate 2 facing away the array substrate 1) in regions corresponding to the plurality of ridge lines RL, total reflection conditions in these regions are disrupted (for example, the medium on a side of the counter substrate 2 facing away the array substrate 1 is not air but finger). Light irradiates on the surface TS of the counter substrate 2 facing away the array substrate 1 in the regions corresponding to the plurality of ridge lines RL, diffused reflection occurs on the interface, thereby generating diffused reflected light transmitting along various directions. A photosensor proximal to the one of the plurality of ridge lines RL detects less reflected light as compared to the one corresponding to the one of the plurality of valley lines VL. Accordingly, the plurality of ridge lines RL and plurality of valley lines VL can be differentiated and recognized.

Referring to FIG. 1, in some embodiments, the integrated photo-sensing detection display apparatus further includes an addressable diffraction grating layer 40 on a side of the base substrate 10 away from the plurality of light emitting elements 30. The addressable diffraction grating layer 40 includes a plurality of individually addressable diffraction regions (e.g., regions DR1 to DR5 in FIG. 1). In some embodiments, the integrated photo-sensing detection display apparatus further includes a grating layer driver circuit 20 configured to independently control light diffraction respectively in the plurality of individually addressable diffraction regions; and a photosensor 50 on a side of the addressable diffraction grating layer 40 away from the base substrate 10 and configured to detect light transmitted from one or more of the plurality of individually addressable diffraction regions, thereby detecting fingerprint information. The addressable diffraction grating layer 40 is configured to at least partially collimate light to form a substantially collimated light beam.

Figure 2:
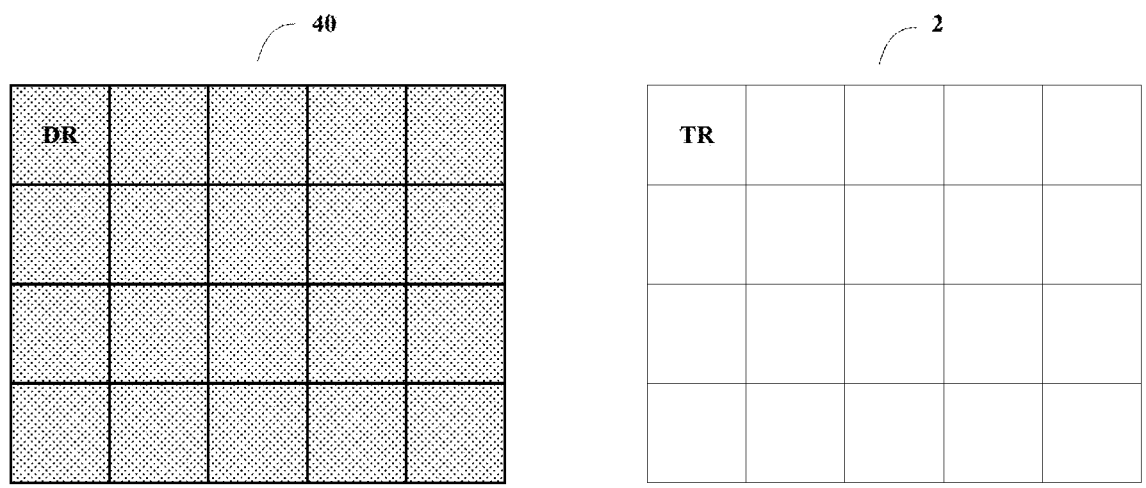
FIG. 2 illustrates an arrangement of a plurality of individually addressable diffraction regions of an addressable diffraction grating layer respectively corresponding to a plurality of touch sensing regions TR in some embodiments according to the present disclosure.

FIG. 2 illustrates an arrangement of a plurality of individually addressable diffraction regions of an addressable diffraction grating layer respectively corresponding to a plurality of touch sensing regions TR in some embodiments according to the present disclosure. Referring to FIG. 2, the plurality of individually addressable diffraction regions DR of an addressable diffraction grating layer 40 may be arranged in a form of an array. Optionally, the integrated photo-sensing detection display apparatus has a plurality of touch sensing regions TR on the counter substrate 2. Optionally, a respective one of the plurality of individually addressable diffraction regions DR corresponds to a respective one of the plurality of touch sensing regions TR. In one example, one of the plurality of individually addressable diffraction regions DR is turned on to diffract light when a touch occurs in the respective one of the plurality of touch sensing regions TR corresponding to the one of the plurality of individually addressable diffraction regions DR being turned on. Optionally, a respective one of the plurality of individually addressable diffraction regions DR corresponds to two or more of the plurality of touch sensing regions TR. In one example, one of the plurality of individually addressable diffraction regions DR is turned on to diffract light when a touch occurs in any one of the two or more of the plurality of touch sensing regions TR corresponding to the one of the plurality of individually addressable diffraction regions DR being turned on.

Various appropriate diffraction grating devices may be used in the present disclosure. For example, the addressable diffraction grating layer may be of any appropriate type, including a reflective-type diffraction grating and a transmissive-type diffraction grating. In one example, the addressable diffraction grating layer is a diffraction grating lens layer. In another example, the addressable diffraction grating layer is a nano-diffraction grating layer. In another example, the addressable diffraction grating layer is a liquid crystal diffraction grating layer.

Figure 3:
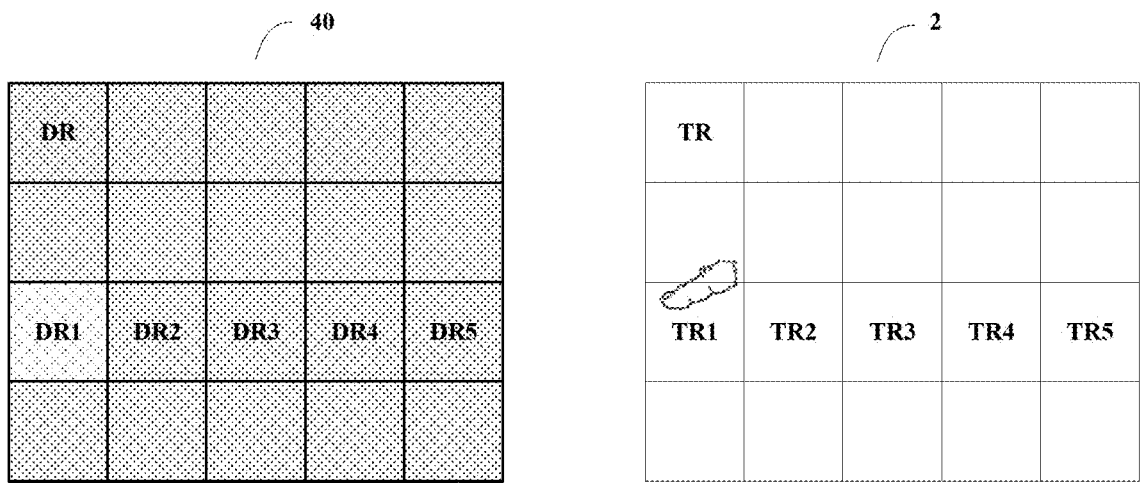
FIG. 3 illustrates a touch event on one of a plurality of touch sensing regions TR and light diffraction in a corresponding one of a plurality of individually addressable diffraction regions of an addressable diffraction grating layer in some embodiments according to the present disclosure.
Figure 4:
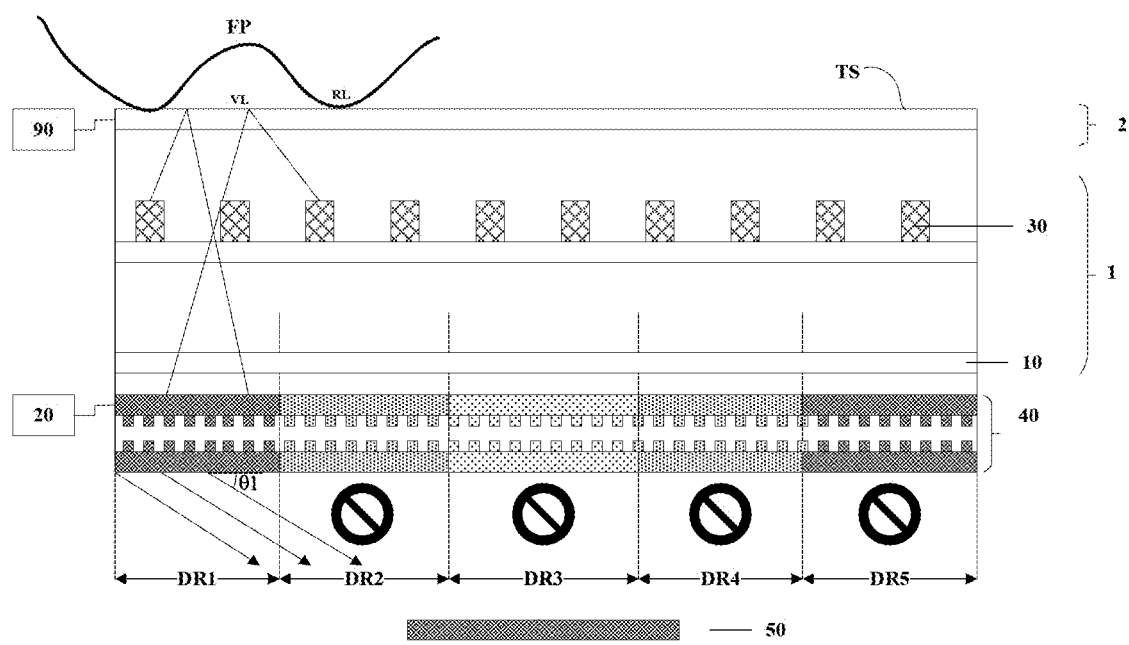
FIG. 4 is a schematic diagram illustrating light diffraction in one of a plurality of individually addressable diffraction regions of an addressable diffraction grating layer in an integrated photo-sensing detection display apparatus in some embodiments according to the present disclosure.

In some embodiments, the grating layer driver circuit is configured to selectively switch on at least a first individually addressable diffraction region to diffract a portion of the totally reflected light to the photosensor, and selectively switch off at least a second individually addressable diffraction region so that substantially no light transmitted through the second individually addressable diffraction region. FIG. 3 illustrates a touch event on one of a plurality of touch sensing regions TR and light diffraction in a corresponding one of a plurality of individually addressable diffraction regions of an addressable diffraction grating layer in some embodiments according to the present disclosure. Referring to FIG. 3, a touch (e.g., a finger touch) occurs in a first touch sensing region TR1 of the plurality of touch sensing regions TR. Corresponding to the touch in the first touch sensing region TR1, a first individually addressable diffraction region DR1 is selectively switched on, while the other regions (e.g., the second individually addressable diffraction region DR2, the third individually addressable diffraction region DR3, the fourth individually addressable diffraction region DR4, and the fifth individually addressable diffraction region DR5) are selectively switched off. FIG. 4 is a schematic diagram illustrating light diffraction in one of a plurality of individually addressable diffraction regions of an addressable diffraction grating layer in an integrated photo-sensing detection display apparatus in some embodiments according to the present disclosure. Referring to FIG. 4, the first individually addressable diffraction region DR1, when switched on, is configured to diffract light toward the photosensor 50 at a first exit angle of θ1. The other individually addressable diffraction regions, including the second individually addressable diffraction region DR2, the third individually addressable diffraction region DR3, the fourth individually addressable diffraction region DR4, and the fifth individually addressable diffraction region DR5, are turned off, and substantially no light transmits through these regions.

Referring to FIG. 1 and FIG. 4, in some embodiments, the integrated photo-sensing detection display apparatus further includes a touch sensing driver circuit 90. The touch sensing driver circuit 90 is configured to detect a touch position in the integrated photo-sensing detection display apparatus. Based on the detected touch position, the grating layer driver circuit 20 is configured to select the first individually addressable diffraction region to be turned on and the second individually addressable diffraction region to be turned off. By selectively detecting light transmitted from only a certain region of the plurality of individually addressable diffraction regions DR corresponding to a touch sensing region having a touch occurrence, light from touch sensing regions where no touch has occurred are substantially reduced or blocked from reaching the photosensor 50. Only light from the touch sensing region having a touch event is allowed to reach the photosensor 50, a signal-to-noise level of light detected by the photosensor 50 can be significantly enhanced, improving fingerprint sensing accuracy.

Figure 5:
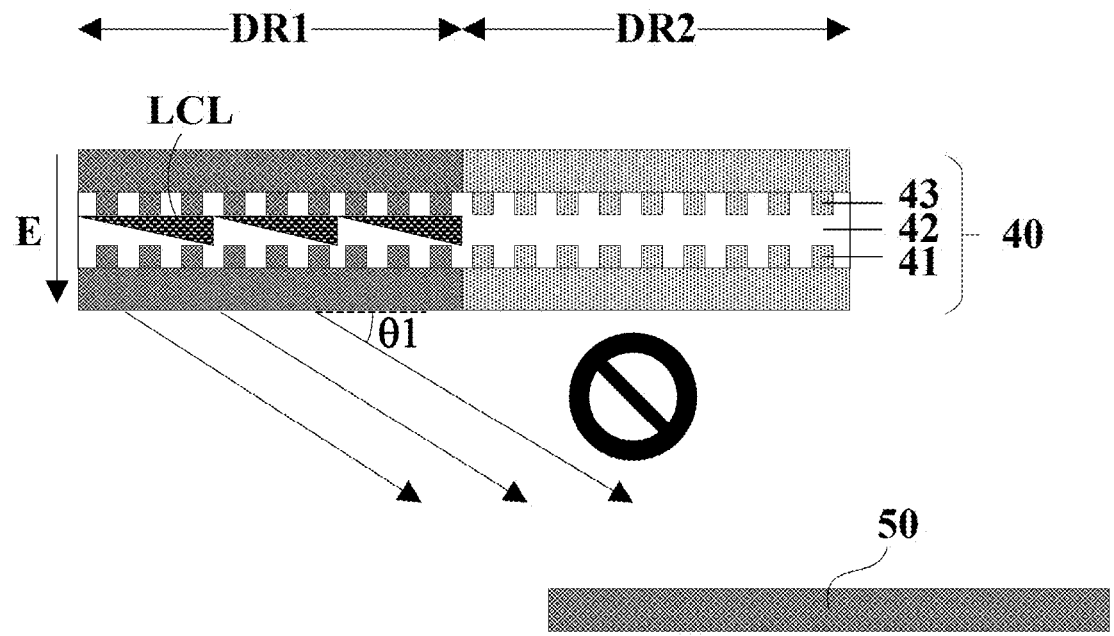
FIG. 5 is a schematic diagram illustrating the structure of an addressable diffraction grating layer in some embodiments according to the present disclosure.

FIG. 5 is a schematic diagram illustrating the structure of an addressable diffraction grating layer in some embodiments according to the present disclosure. Referring to FIG. 5, the addressable diffraction grating layer 40 in some embodiments includes a first electrode layer 41, a second electrode layer 43, and a liquid crystal layer 42 between the first electrode layer 41 and the second electrode layer 43. The first electrode layer 41 and the second electrode layer 43 in different individually addressable diffraction regions can be individually addressable, e.g., individually switched on or off. FIG. 5 shows an embodiment in which an electric field E is applied between the first electrode layer 41 and the second electrode layer 43 in a first individually addressable diffraction region DR1, while no electric field is applied in a second individually addressable diffraction region DR2. When the electric field E is applied between the first electrode layer 41 and the second electrode layer 43 in the first individually addressable diffraction region DR1, a plurality of liquid crystal lenses LCL are formed between the first electrode layer 41 and the second electrode layer 43 in the first individually addressable diffraction region DR1. The plurality of liquid crystal lenses LCL are configured to diffract light toward the photosensor 50 at a first exit angle θ1. The first exit angle θ1 is adjustable based on the electric field E applied between the first electrode layer 41 and the second electrode layer 43 in the first individually addressable diffraction region DR1. In the second individually addressable diffraction region DR2, no electric field is applied, and the liquid crystal layer 42 does not form a plurality of liquid crystal lenses. Accordingly, substantially no light transmits through the second individually addressable diffraction region DR2 of the addressable diffraction grating layer 40.

Because fingerprint information is largely absent in light reflected to the second individually addressable diffraction region DR2 (as well as other regions such as DR3, DR4, and DR5), light in the second individually addressable diffraction region DR2 is filtered out from being transmitted to the photosensor 50. Light from the first individually addressable diffraction region DR1, which contains most relevant fingerprint information from the corresponding touch sensing region where a touch event occurs, is allowed to pass through to the photosensor 50. The fingerprint information is significantly enriched in the light detected by the photosensor 50, and the signal-to-noise level of the light detected by the photosensor 50 is much increased.

Referring to FIG. 1 and FIG. 4, in some embodiments, the photosensor 50 has an area smaller than an area of the integrated photo-sensing detection display apparatus. The addressable diffraction grating layer 40 is configured to form collimated light beams transmitting toward the photosensor 50 respectively at different exit angles depending on a light exiting position on the addressable diffraction grating layer 40 relative to the photosensor 50. Thus, fingerprint information generated from a touch at any portion of the counter substrate 2 can be detected by the photosensor 50 of a relatively small size as compared to the counter substrate 2.

A respective one of the plurality of individually addressable diffraction regions corresponds to one or more subpixels of the integrated photo-sensing detection display apparatus. Optionally, the respective one of the plurality of individually addressable diffraction regions corresponds to a single subpixel of the integrated photo-sensing detection display apparatus. Optionally, the respective one of the plurality of individually addressable diffraction regions corresponds to dozens of subpixels of the integrated photo-sensing detection display apparatus. In one example, a display area of the integrated photo-sensing detection display apparatus can be divided into nine different regions, which respectively correspond to a total of nine individually addressable diffraction regions.

Figure 6:
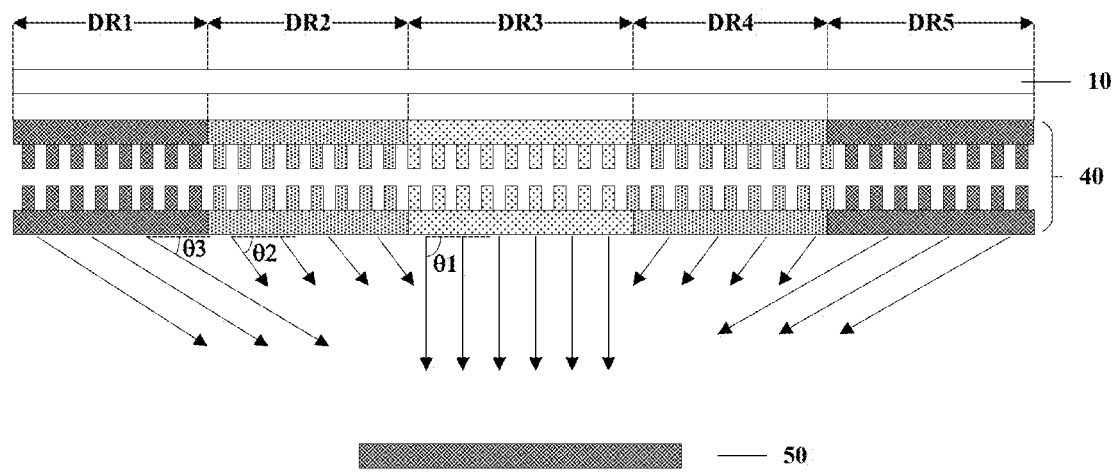
FIG. 6 illustrates a plurality of individually addressable diffraction regions configured to diffract light to a photosensor at different exit angles in some embodiments according to the present disclosure.

FIG. 6 illustrates a plurality of individually addressable diffraction regions configured to diffract light to a photosensor at different exit angles in some embodiments according to the present disclosure. Referring to FIG. 6, the first individually addressable diffraction region DR1 is configured to collimate light transmitted to the first individually addressable diffraction region DR1 to exit the first individually addressable diffraction region DR1 at a third exit angle $\theta 3$, thereby forming a first collimated light beam toward the photosensor 50. The second individually addressable diffraction region DR2 is configured to collimate light transmitted to the second individually addressable diffraction region DR2 to exit the second individually addressable diffraction region DR2 at a second exit angle $\theta 2$, thereby forming a second collimated light beam toward the photosensor 50. The third individually addressable diffraction region DR3 is configured to collimate light transmitted to the third individually addressable diffraction region DR3 to exit the third individually addressable diffraction region DR3 at a first exit angle $\theta 1$, thereby forming a third collimated light beam toward the photosensor 50. The first exit angle $\theta 1$, the second exit angle $\theta 2$, and the third exit angle $\theta 3$ are different from each other.

Various appropriate methods may be used for adjusting exit angles of different individually addressable diffraction regions of the addressable diffraction grating layer 40. In one example, the addressable diffraction grating layer 40 is a liquid crystal diffraction grating layer. In one example, the pitches of different individually addressable diffraction regions may be adjusted to different values to achieve different exit angles. For example, in some embodiments, the first individually addressable diffraction region DR1 has a first grating pitch, the second individually addressable diffraction region DR2 has a second grating pitch, and the third individually addressable diffraction region DR3 has a third grating pitch. The first grating pitch, the second grating pitch, and the third grating pitch are different from each other. In another example, the refractive index of the different individually addressable diffraction regions may be adjusted to different values to achieve different exit angles. For example, in some embodiments, the first individually addressable diffraction region DR1 has a first refractive index, the second individually addressable diffraction region DR2 has a second refractive index, and the third individually addressable diffraction region DR3 has a third refractive index. The first refractive index, the second refractive index, and the third refractive index are different from each other.

Figure 7:
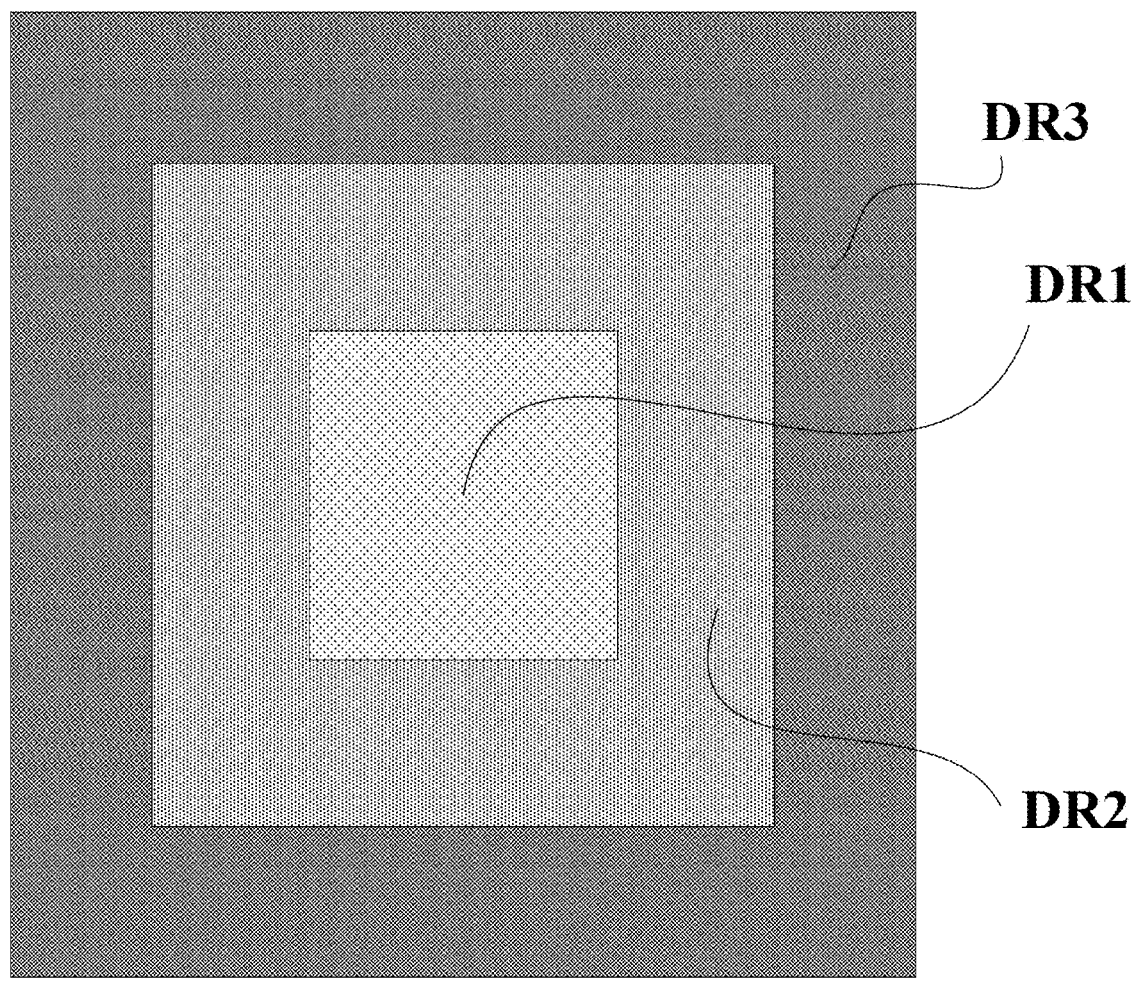
FIG. 7 is a schematic diagram illustrating the structure of an addressable diffraction grating layer in some embodiments according to the present disclosure.

FIG. 7 is a schematic diagram illustrating the structure of an addressable diffraction grating layer in some embodiments according to the present disclosure. Referring to FIG. 7, in some embodiments, the addressable diffraction grating layer 40 includes a plurality of individually addressable diffraction regions, for example, a first individually addressable diffraction region DR1, a second individually addressable diffraction region DR2, and a third individually addressable diffraction region DR3, as shown in FIG. 7. Different individually addressable diffraction regions of the addressable diffraction grating layer 40 are configured to diffract an incident light at different exiting angles toward the photosensor. In some embodiments, the second individually addressable diffraction region DR2 surrounds the first individually addressable diffraction region DR1, and the third individually addressable diffraction region DR3 surrounds the second individually addressable diffraction region DR2. The first exit angle $\theta 1$ is greater than the second exit angle $\theta 2$, and the second exit angle $\theta 2$ is greater than the third exit angle $\theta 3$. Optionally, the first grating pitch is greater than the second grating pitch, which in turn is greater than the third grating pitch. In some embodiments, an orthographic projection of the second individually addressable diffraction region DR2 on the base substrate 10 is on a side of an orthographic projection of the first individually addressable diffraction region DR1 on the base substrate 10 away from an orthographic projection of the photosensor 50 on the base substrate 10; and an orthographic projection of the third individually addressable diffraction region DR3 on the base substrate 10 is on a side of an orthographic projection of the second individually addressable diffraction region DR2 on the base substrate 10 away from an orthographic projection of the photosensor 50 on the base substrate 10.

Figure 8:
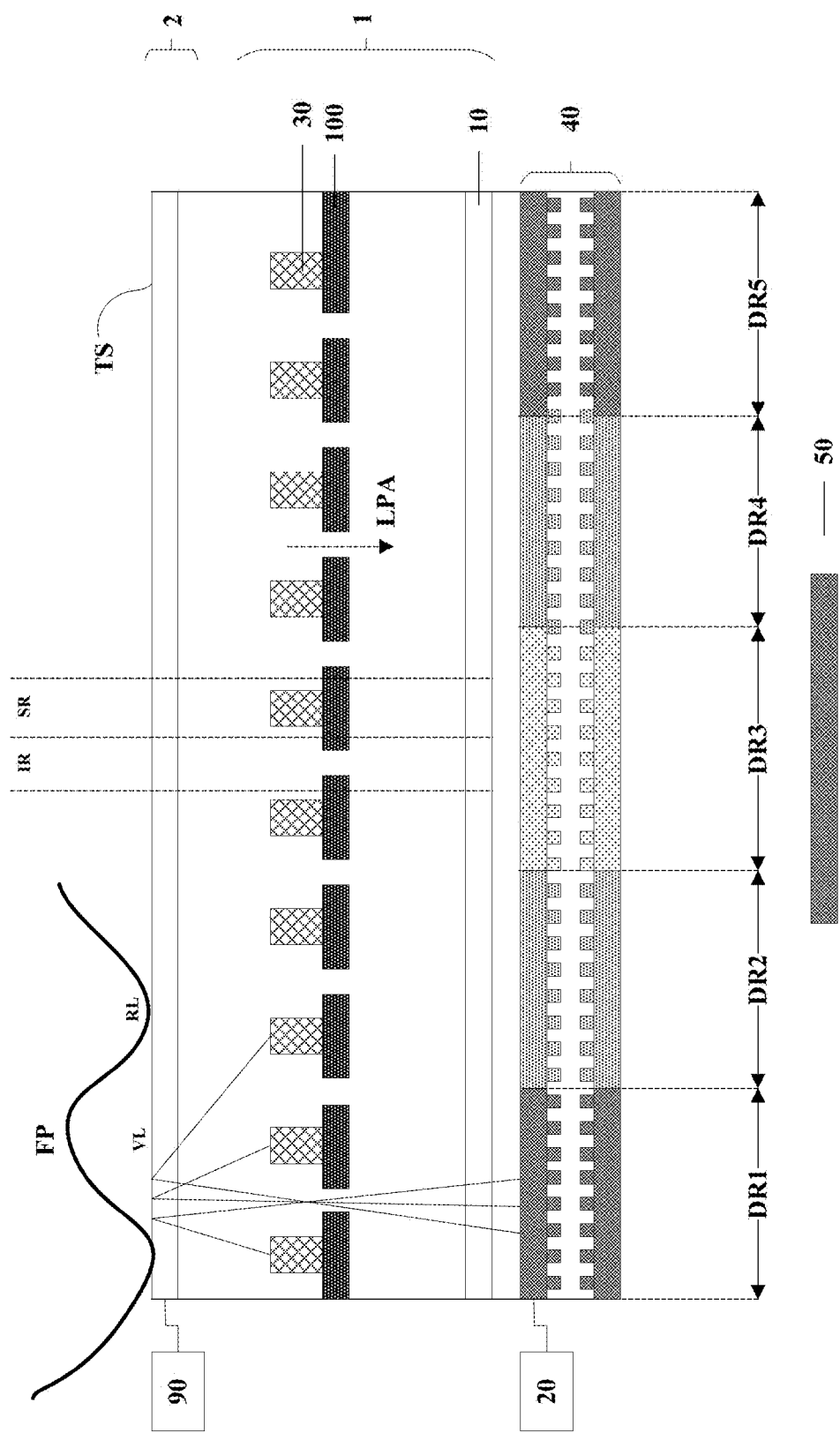
FIG. 8 is a schematic diagram illustrating the structure of an integrated photo-sensing detection display apparatus in some embodiments according to the present disclosure.

To further enhance the signal-to-noise level of light detected by the photosensor 50, the integrated photo-sensing detection display apparatus in some embodiments further includes a light shielding layer. FIG. 8 is a schematic diagram illustrating the structure of an integrated photo-sensing detection display apparatus in some embodiments according to the present disclosure. Referring to FIG. 8, the array substrate 1 in some embodiments further includes a light shielding layer 100 between the plurality of light emitting elements 30 and the base substrate 10. The integrated photo-sensing detection display apparatus in some embodiments has a subpixel region SR and an inter-subpixel region IR. As used herein, a subpixel region refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel. As used herein, an inter-subpixel region refers to a region between adjacent subpixel regions, such as a region corresponding to a black matrix in a liquid crystal display, a region corresponding a pixel definition layer in an organic light emitting diode display panel, or a black matrix in the present display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

Referring to FIG. 8, the light shielding layer 100 is configured to block at least a portion of diffusedly reflected light from passing through. As shown in FIG. 8, the light shielding layer 20 has a light path aperture LPA in the inter-subpixel region IR that allows at least a portion of the totally reflected light to pass through thereby forming a signal-enriched light beam. By having the light path aperture LPA in the inter-subpixel region IR, the diffusedly reflected light can be blocked while allowing the at least a portion of the totally reflected light to pass through, thereby enhancing the signal-noise ratio in detection of the fingerprint information. The diffusedly reflected light can be, for example, the light diffusedly reflected by components of the display apparatus, e.g., lateral walls of one or more layers or metal lines in the display apparatus. The addressable diffraction grating layer 40 is configured to at least partially collimate the signal-enriched light beam thereby forming a collimated light beam. The photosensor 50 is configured to detect the collimated light beam, thereby detecting fingerprint information.

Figure 9A:
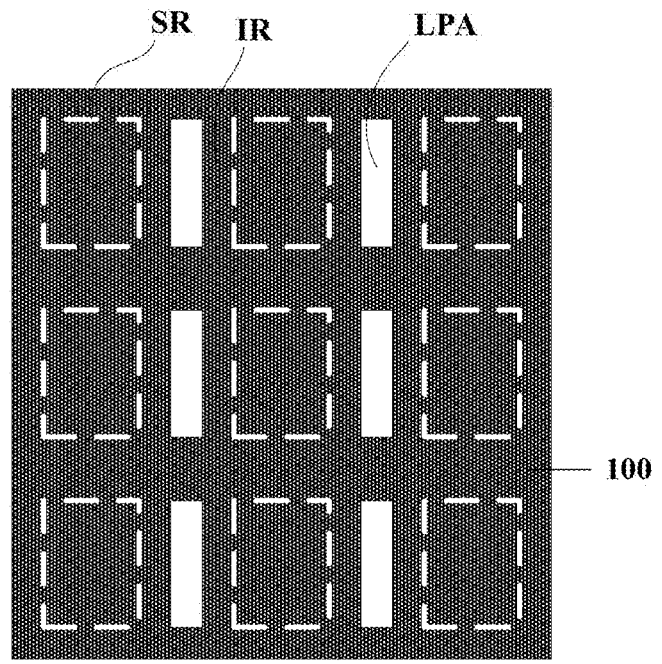
FIGS. 9A to 9C illustrate the structure of a light shield layer in some embodiments according to the present disclosure.
Figure 9B:
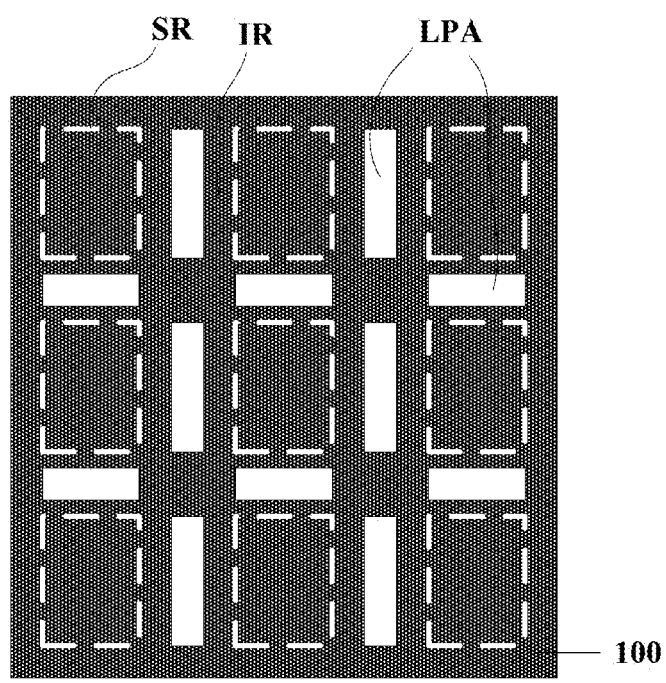
Figure 9C:
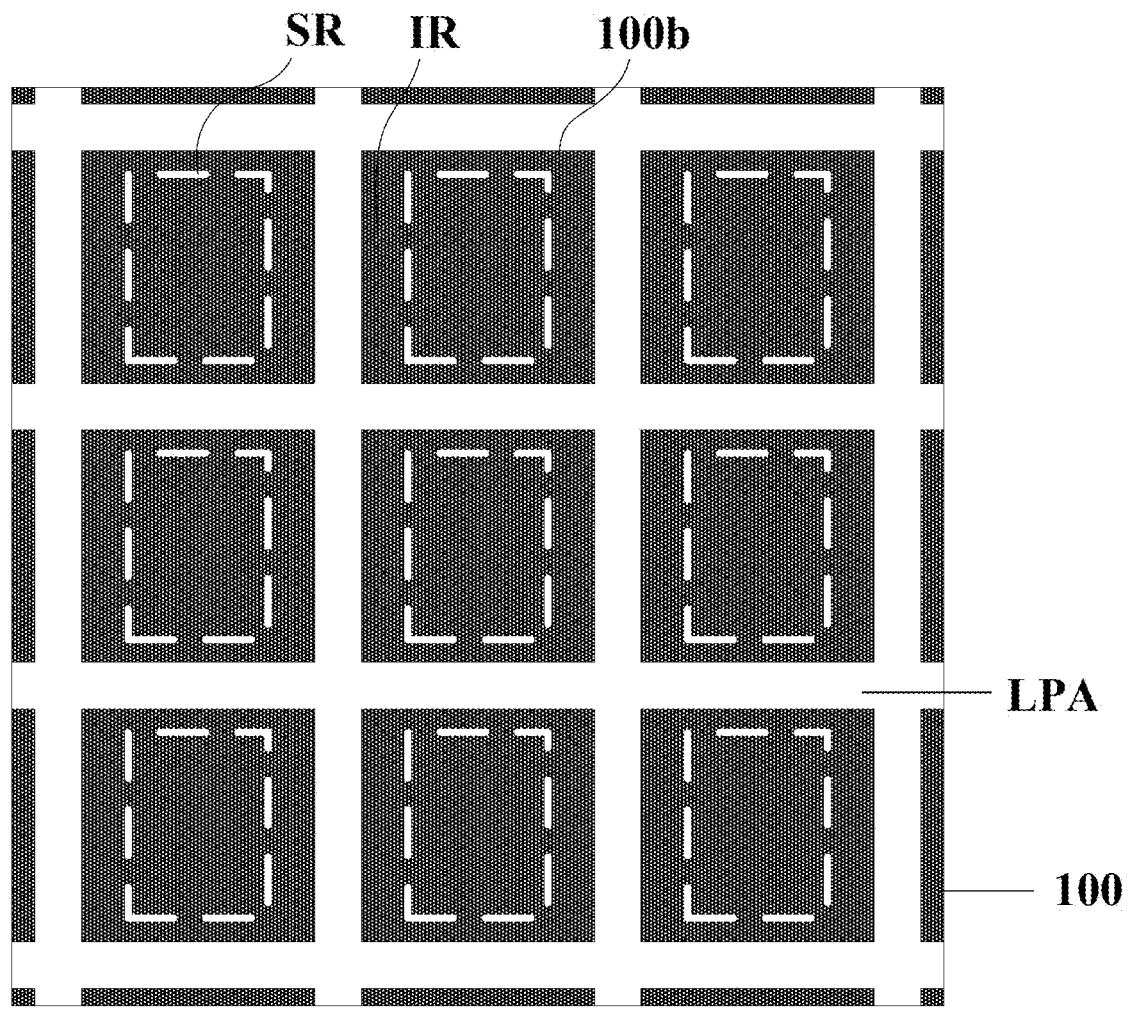

FIGS. 9A to 9C illustrate the structure of a light shield layer in some embodiments according to the present disclosure. Referring to FIG. 9A, the integrated photo-sensing detection display apparatus includes multiple ones of the light path aperture LPA corresponding to multiple subpixels, the multiple ones of the light path aperture LPA are spaced apart from each other. In some embodiments, the light path aperture LPA is between longitudinal sides of adjacent ones of the subpixel region SR. Referring to FIG. 9B, the light path aperture LPA is between longitudinal sides of adjacent ones of the subpixel region SR, as well as between lateral sides of adjacent ones of the subpixel region SR. The multiple ones of the light path aperture LPA are spaced apart from each other, and form a plurality of rows and a plurality of columns. Referring to FIG. 9C, the light path aperture LPA in some embodiments is a continuous network extending throughout an entirety of the integrated photo-sensing detection display apparatus, dividing the light shielding layer 100 into a plurality of light shielding blocks 100b.

Any appropriate light shielding materials and any appropriate fabricating methods may be used to make the light shielding layer 100. For example, a light shielding material may be deposited on the base substrate (e.g., by sputtering or vapor deposition); and patterned (e.g., by lithography such as a wet etching process) to form the light shielding layer 100. Examples of appropriate light shielding materials include, but are not limited to, molybdenum, aluminum, copper, chromium, tungsten, titanium, tantalum, and alloys or laminates containing the same. In one example, the light shielding layer 100 is made of an insulating material, e.g., an insulating black material. In another example, the light shielding layer 100 is made of a conductive material, e.g., a reflective metallic material.

In some embodiments, the light shielding layer 100 has an area greater than an area of the subpixel region SR, as shown in FIGS. 9A to 9C. An orthographic projection of the light shielding layer 100 on the base substrate 10 covers an orthographic projection of the subpixel region SR on the base substrate 10, as shown in FIGS. 9A to 9C. In some embodiments, the light path aperture LPA has an area smaller than an area of the inter-subpixel region IR.

Figure 10:
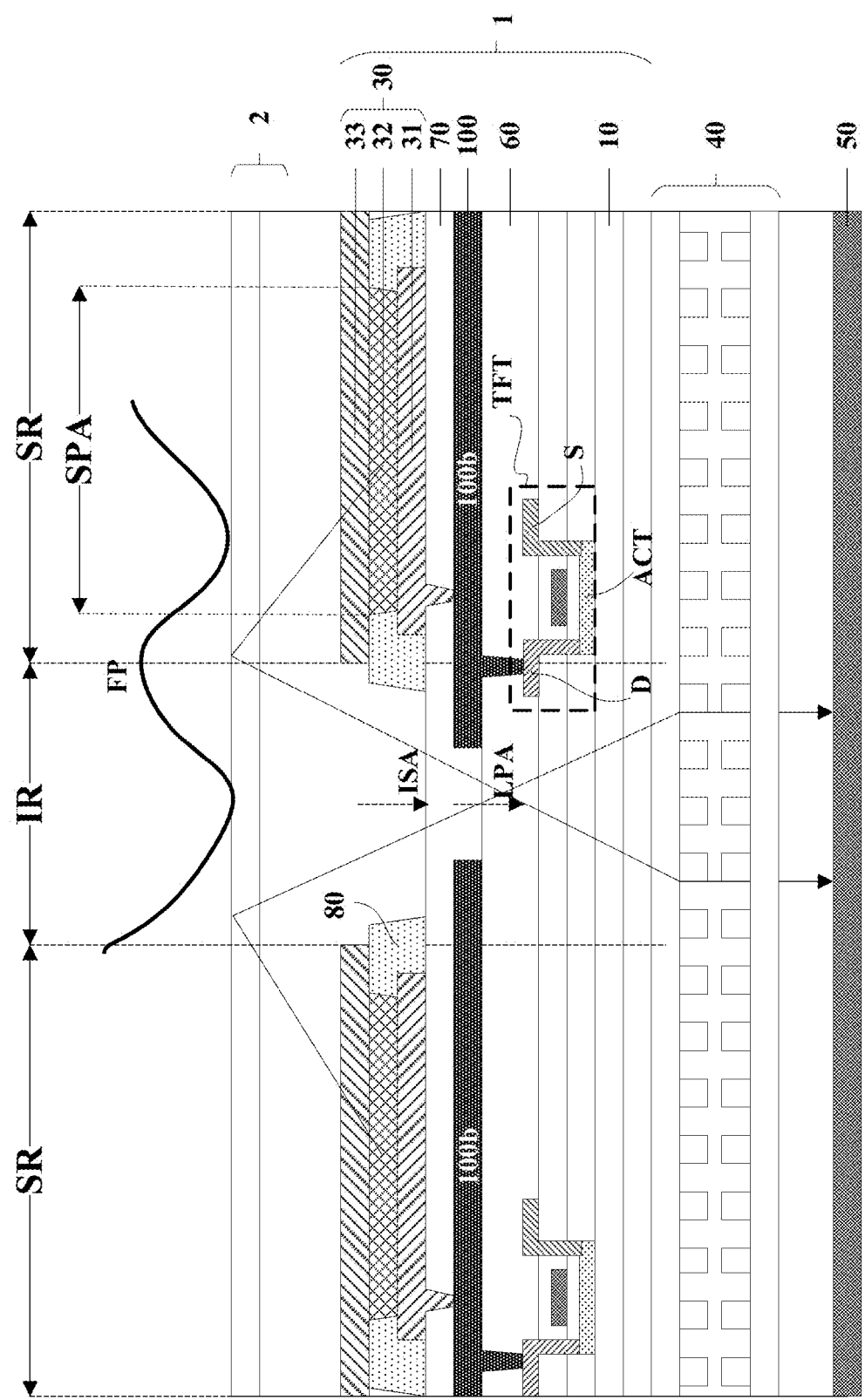
FIG. 10 is a schematic diagram illustrating the structure of an integrated photo-sensing detection display apparatus in some embodiments according to the present disclosure.

FIG. 10 is a schematic diagram illustrating the structure of an integrated photo-sensing detection display apparatus in some embodiments according to the present disclosure. Referring to FIG. 10, the array substrate 1 of the integrated photo-sensing detection display apparatus in some embodiments further includes a plurality of thin film transistors TFT configured to drive light emission of the plurality of light emitting elements 30. As shown in FIG. 10, a respective one of the plurality of thin film transistors TFT includes a drain electrode D and a source electrode S respectively connected to an active layer ACT, a data signal transmits from the source electrode S to the drain electrode D when a respective one of the plurality of thin film transistors TFT is turned on.

In one example, the light shield layer 100 includes a plurality of light shielding blocks 100b spaced apart from each other (and insulated from each other). In some embodiments, a respective one of the plurality of light shielding blocks 100b is electrically connected to the drain electrode D of a respective one of the plurality of thin film transistors TFT, as shown in FIG. 10. Optionally, a respective one of the plurality of light shielding blocks 100b is at least partially in the subpixel region SR. Optionally, an orthographic projection of a respective one of the plurality of light shielding blocks 100b on the base substrate 10 covers an orthographic projection of the subpixel region SR in a respective one of the plurality of subpixels of the integrated photo-sensing detection display apparatus. Optionally, the respective one of the plurality of light shielding blocks 100b is at least partially in the inter-subpixel region IR. Optionally, the respective one of the plurality of light shielding blocks 100b extends from the subpixel region SR into the inter-subpixel region IR. Optionally, the respective one of the plurality of light shielding blocks 100b occupies a peripheral region of the subpixel region SR in a respective one of the plurality of subpixels of the integrated photo-sensing detection display apparatus, but is absent in a center region of the subpixel region SR in a respective one of the plurality of subpixels of the integrated photo-sensing detection display apparatus.

Optionally, the array substrate 1 further includes a first insulating layer 60 between the drain electrode D and the light shield layer 100, e.g., between a respective one of the plurality of light shielding blocks 100b and the drain electrode D of the respective one of the plurality of thin film transistors TFT.

In some embodiments, a respective one of the plurality of light emitting elements 30 includes a first electrode 31, a light emitting layer 32, and a second electrode 33 sequentially disposed on the base substrate 10. The first electrode 31 in some embodiments is electrically connected to the light shielding layer 100, e.g., electrically connected to a respective one of the plurality of light shielding blocks 100b. The light emitting layer 32 is on a side of the first electrode 31 away from the base substrate 10, and the second electrode 33 is on a side of the light emitting layer 32 away from the first electrode 31.

Optionally, the array substrate 1 further includes a second insulating layer 70 between the first electrode 31 and the light shield layer 100, e.g., between a respective one of the plurality of light shielding blocks 100b and the first electrode 31 of the respective one of the plurality of light emitting elements 30. Optionally, the second insulating layer 70 is made of an optically transparent material, and the second insulating layer 70 extends into the light path aperture LPA.

Optionally, the first electrode 31 is made of a substantially transparent conductive material. As used herein, the term "substantially transparent" means at least 50 percent (e.g., at least 60 percent, at least 70 percent, at least 80 percent, at least 90 percent, and at least 95 percent) of an incident light in the visible wavelength range transmitted therethrough. Optionally, the second electrode 33 is made of a substantially transparent conductive material.

Optionally, the first electrode 31 is made of a reflective conductive material, e.g., a metallic material. Optionally, the second electrode 33 is made of a substantially transparent conductive material. When the first electrode 31 is made of a reflective conductive material, the light shielding layer 100 (e.g., a respective one of the plurality of light shielding blocks 100b) optionally is absent in a center region of the subpixel region SR of the plurality of subpixels. Optionally, the first electrode 31 is made of a reflective conductive material, and the light shielding layer 100 (e.g., a respective one of the plurality of light shielding blocks 100b) is present in the center region of the subpixel region SR of the plurality of subpixels.

Referring to FIG. 10, the array substrate 1 of the integrated photo-sensing detection display apparatus in some embodiments further includes a pixel definition layer 80 defining a plurality of subpixel apertures SPA. Optionally, an orthographic projection of the light shielding layer 100 on the base substrate 10 covers an orthographic projection of the plurality of subpixel apertures SPA on the base substrate 10. Optionally, an orthographic projection of the light shielding layer 100 on the base substrate 10 covers an orthographic projection of the plurality of light emitting elements 30 on the base substrate 10.

In some embodiments, the pixel definition layer 80 has an inter-subpixel aperture ISA in the inter-subpixel region IR. The inter-subpixel aperture ISA allows at least a portion of the totally reflected light to pass through. In one example, the totally reflected light sequentially passes through the inter-subpixel aperture ISA and the light path aperture IPA before reaching the addressable diffraction grating layer 40. Optionally, the inter-subpixel aperture ISA is larger than the light path aperture LPA, and an orthographic projection of the light shielding layer 100 on the base substrate 10 covers an orthographic projection of the pixel definition layer 80 on the base substrate 10. Optionally, the inter-subpixel aperture ISA has a size substantially the same as the light path aperture LPA. Optionally, the inter-subpixel aperture ISA is smaller than the light path aperture LPA.

To prevent occurrence of parasitic capacitance caused by the light shielding layer 100, in some embodiments, an orthographic projection of the light shield layer 100 on the base substrate 10 is substantially non-overlapping with an orthographic projection of a plurality of data lines and a plurality of gate lines on the base substrate 10. As used herein, the term "substantially non-overlapping" refers to two orthographic projections being at least 80 percent (e.g., at least 85 percent, at least 90 percent, at least 95 percent, at least 99 percent, and 100 percent) non-overlapping. Moreover, the insulating layer (e.g., the first insulating layer 60) can have a relatively large thickness to further reduce the parasitic capacitance between the light shielding layer 100 and signal lines in the array substrate 1.

Figure 11A:
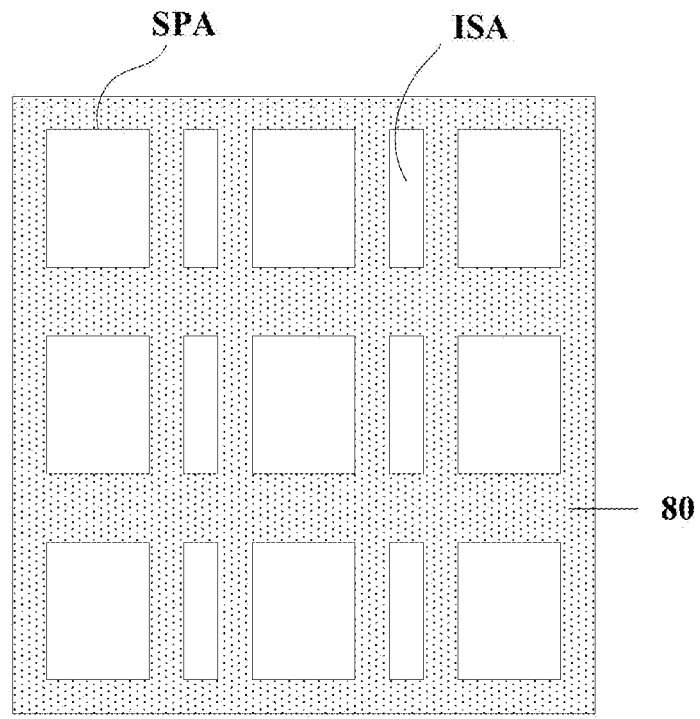
FIGS. 11A to 11C illustrate the structure of a pixel definition layer in some embodiments according to the present disclosure.
Figure 11B:
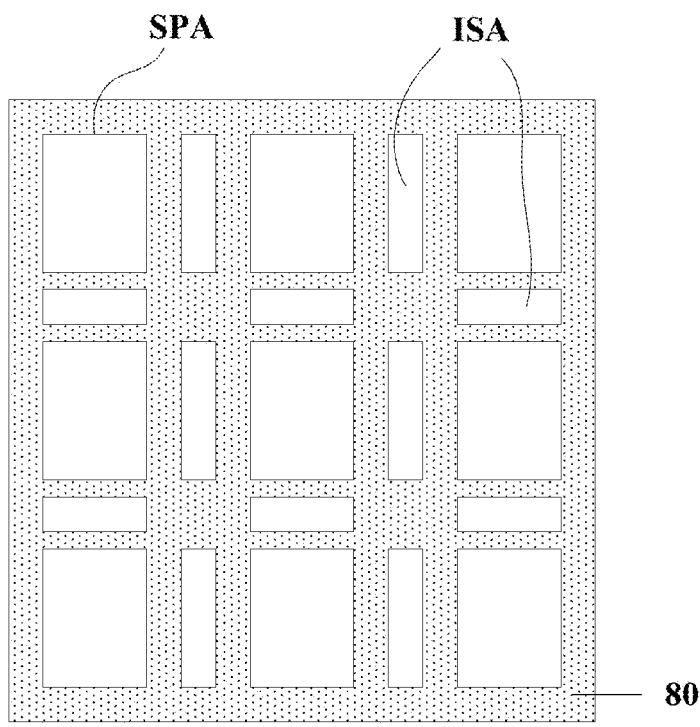
Figure 11C:
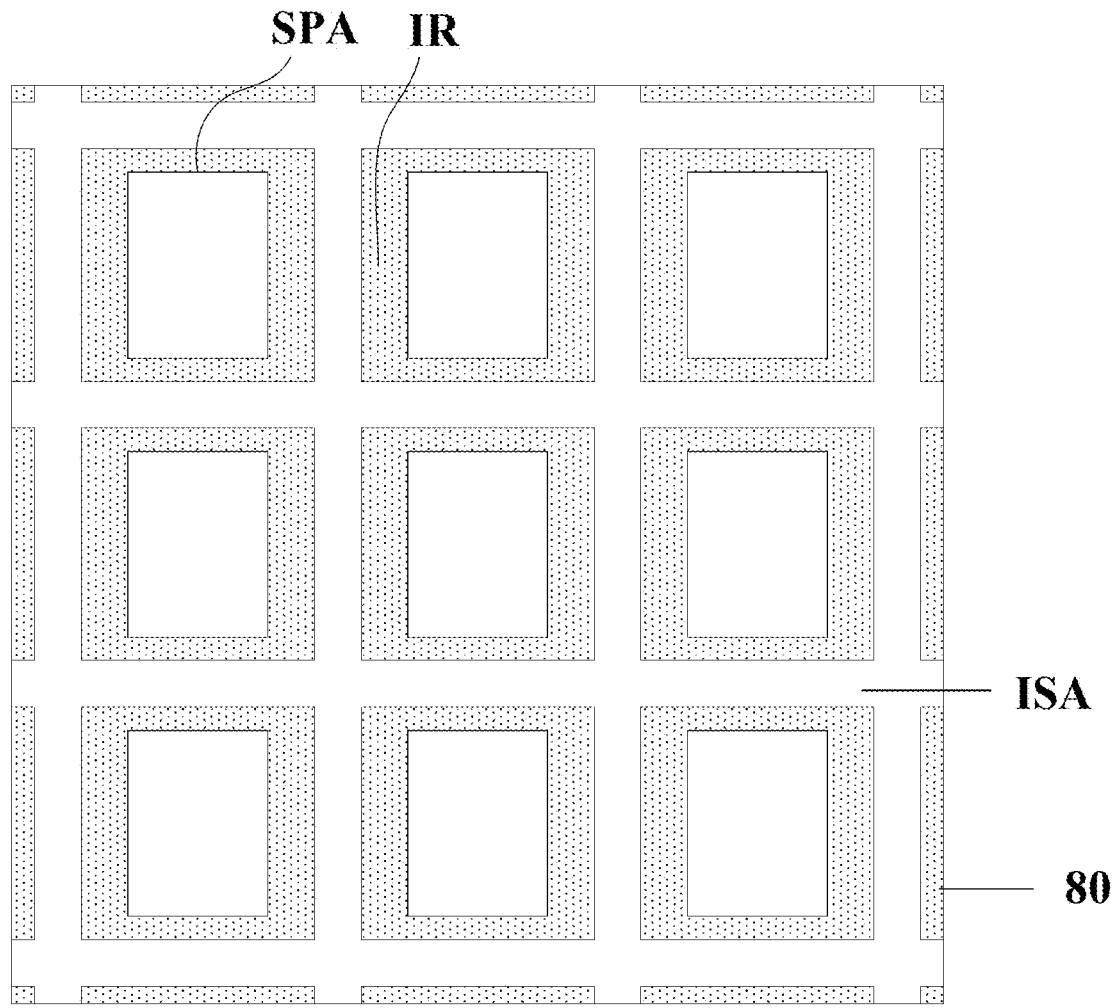

FIGS. 11A to 11C illustrate the structure of a pixel definition layer in some embodiments according to the present disclosure. Referring to FIG. 11A, the integrated photo-sensing detection display apparatus includes multiple ones of the inter-subpixel aperture ISA corresponding to multiple subpixels, the multiple ones of the inter-subpixel aperture ISA are spaced apart from each other. In some embodiments, the inter-subpixel aperture ISA is between longitudinal sides of adjacent ones of the plurality of subpixel apertures SPA. Referring to FIG. 11B, the inter-subpixel aperture ISA is between longitudinal sides of adjacent ones of the plurality of subpixel apertures SPA, as well as between lateral sides of adjacent ones of the plurality of subpixel apertures SPA. The multiple ones of the inter-subpixel aperture ISA are spaced apart from each other, and form a plurality of rows and a plurality of columns. Referring to FIG. 11C, the inter-subpixel aperture ISA in some embodiments forms a continuous network extending throughout an entirety of the integrated photo-sensing detection display apparatus.

Any appropriate pixel definition materials and any appropriate fabricating methods may be used to make the pixel definition layer 80. For example, a pixel definition material may be deposited on the base substrate (e.g., by sputtering or vapor deposition); and patterned (e.g., by lithography such as a wet etching process) to form the pixel definition layer 80. Examples of appropriate pixel definition materials include, but are not limited to, silicon oxide ($SiO_y$), silicon nitride ($SiN_y$, e.g., $Si_3N_4$), silicon oxynitride ($SiO_xN_y$), polyimide, polyamide, acryl resin, benzocyclobutene, and phenol resin. Optionally, the pixel definition layer 80 may have a single-layer structure or a stacked-layer structure including two or more sub-layers (e.g., a stacked-layer structure including a silicon oxide sublayer and a silicon nitride sublayer).

Figure 12:
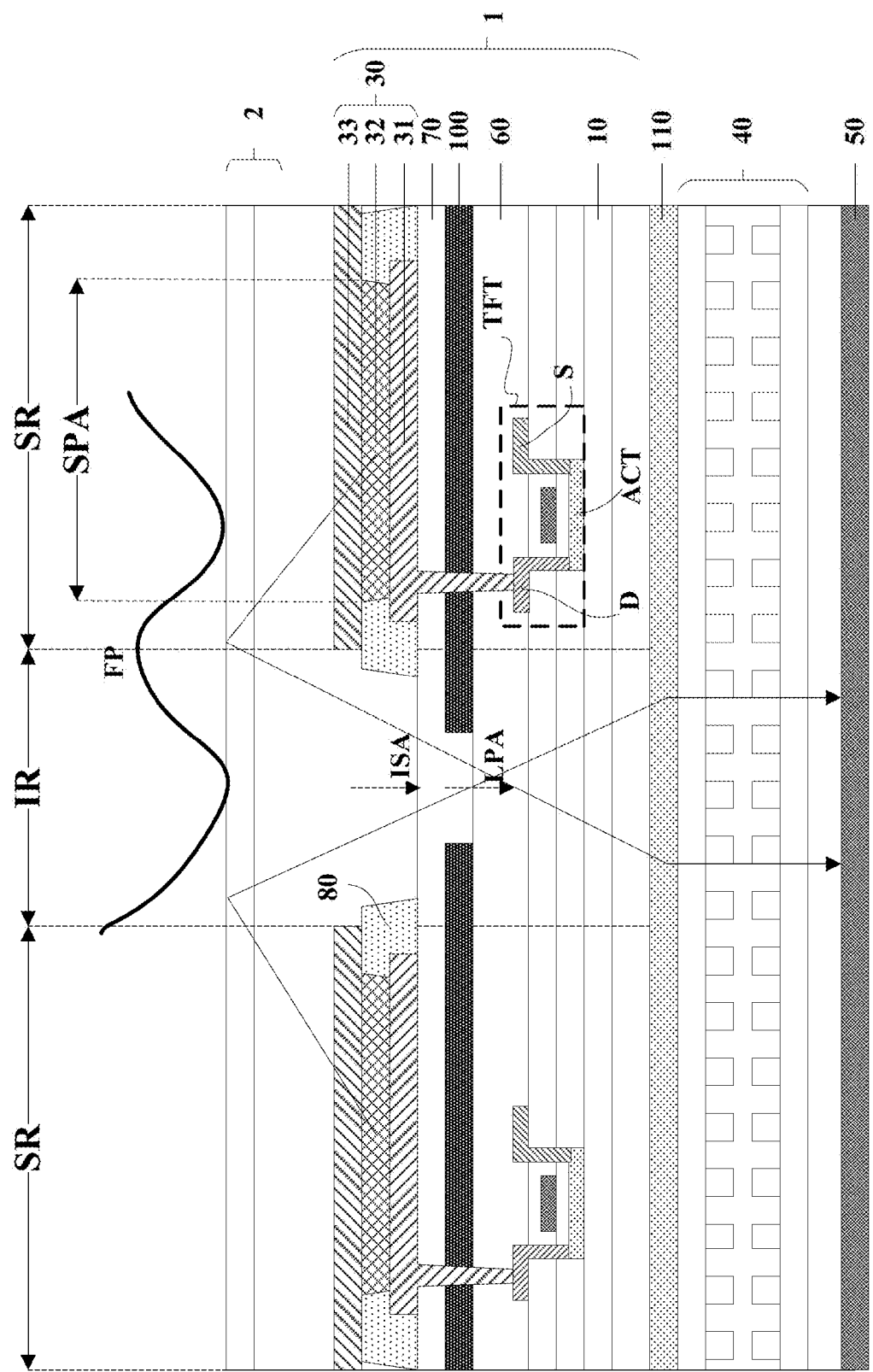
FIG. 12 is a schematic diagram illustrating the structure of an integrated photo-sensing detection display apparatus in some embodiments according to the present disclosure.

FIG. 12 is a schematic diagram illustrating the structure of an integrated photo-sensing detection display apparatus in some embodiments according to the present disclosure. Referring to FIG. 12, the light shielding layer 100 in some embodiments is made of an insulating material. Optionally, the first electrode 31 is electrically connected to the drain electrode D of a respective one of the plurality of thin film transistors TFT through a via extending through at least the light shielding layer 100. A light shielding layer 100 made of the insulating material obviates the parasitic capacitance issue. Referring to FIG. 12, in some embodiments, the integrated photo-sensing detection display apparatus further includes a light collimating film 110 on a side of the addressable diffraction grating layer 40 away from the photosensor 50. The light collimating film 110 is configured to collimate the totally reflected light before it reaches the addressable diffraction grating layer 40.

In another aspect, the present disclosure provides an integrated photo-sensing detection display substrate. In some embodiments, the integrated photo-sensing detection display substrate includes a base substrate; a plurality of light emitting elements on the base substrate and configured to emit light, a portion of the light being totally reflected by a surface thereby forming totally reflected light; an addressable diffraction grating layer on a side of the base substrate away from the plurality of light emitting elements, and including a plurality of individually addressable diffraction regions, light diffraction respectively in the plurality of individually addressable diffraction regions being independently controllable; and a photosensor on a side of the addressable diffraction grating layer away from the base substrate and configured to detect light transmitted from one or more of the plurality of individually addressable diffraction regions, thereby detecting fingerprint information. Optionally, the photosensor has an area smaller than an area of the integrated photo-sensing detection display substrate. Optionally, the addressable diffraction grating layer is configured to form collimated light beams transmitting toward the photosensor respectively at different exit angles depending on a light exiting position on the addressable diffraction grating layer relative to the photosensor. Optionally, the plurality of individually addressable diffraction regions comprises a first individually addressable diffraction region and a second individually addressable diffraction region. Optionally, the first individually addressable diffraction region is configured to collimate light transmitted to the first individually addressable diffraction region to exit the first individually addressable diffraction region at a first exit angle toward the photosensor. Optionally, the second individually addressable diffraction region is configured to collimate light transmitted to the second individually addressable diffraction region to exit the second individually addressable diffraction region at a second exit angle toward the photosensor. Optionally, the second exit angle and the first exit angle are different from each other.

In some embodiments, the integrated photo-sensing detection display substrate has a subpixel region and an inter-subpixel region. Optionally, the integrated photo-sensing detection display substrate further includes a light shielding layer between the plurality of light emitting elements and the base substrate configured to block at least a portion of diffusedly reflected light from passing through, the light shielding layer having a light path aperture in the inter-subpixel region allowing at least a portion of the totally reflected light to pass through thereby forming a signal-enriched light beam. Optionally, the addressable diffraction grating layer is configured to at least partially collimate the signal-enriched light beam thereby forming a collimated light beam. Optionally, the photosensor is configured to detect the collimated light beam, thereby detecting fingerprint information. Optionally, the light shielding layer has an area greater than an area of the subpixel region. Optionally, an orthographic projection of the light shielding layer on the base substrate covers an orthographic projection of the subpixel region on the base substrate.

In some embodiments, the integrated photo-sensing detection display substrate further includes a plurality of thin film transistors configured to drive light emission of the plurality of light emitting elements. Optionally, a respective one of the plurality of thin film transistors includes a drain electrode; the light shield layer includes a plurality of light shielding blocks spaced apart from each other; and a respective one of the plurality of light shielding blocks is electrically connected to the drain electrode of a respective one of the plurality of thin film transistors. Optionally, the integrated photo-sensing detection display substrate further includes a first insulating layer between the drain electrode and the light shield layer. Optionally, a respective one of the plurality of light emitting elements comprises a first electrode electrically connected to the light shielding layer. Optionally, the integrated photo-sensing detection display substrate further includes a second insulating layer between the first electrode and the light shield layer. Optionally, the second insulating layer extends into the light path aperture. Optionally, the first electrode is made of a substantially transparent conductive material.

In some embodiments, the integrated photo-sensing detection display substrate further includes a pixel definition layer defining a plurality of subpixel apertures. Optionally, the pixel definition layer has an inter-subpixel aperture in the inter-subpixel region allowing at least a portion of the totally reflected light to pass through sequentially the inter-subpixel aperture and the light path aperture. Optionally, the inter-subpixel aperture is larger than the light path aperture; and an orthographic projection of the light shielding layer on the base substrate covers an orthographic projection of the pixel definition layer on the base substrate.

Optionally, the addressable diffraction grating layer is a nano-diffraction grating layer.

Optionally, the addressable diffraction grating layer is a liquid crystal diffraction grating layer.

Optionally, the integrated photo-sensing detection display substrate further includes a light collimating film on a side of the addressable diffraction grating layer away from the photosensor.

In another aspect, the present disclosure provides a method of driving photo-sensing detection in an integrated photo-sensing detection display apparatus. In some embodiments, the method includes selectively switching on at least a first individually addressable diffraction region to diffract a portion of the totally reflected light to the photosensor, and selectively switching off at least a second individually addressable diffraction region so that substantially no light transmitted through the second individually addressable diffraction region.

In some embodiments, the method further includes detecting a touch position in the integrated photo-sensing detection display apparatus. Optionally, the first individually addressable diffraction region and the second individually addressable diffraction region are selected based on the touch position.

In some embodiments, the method further includes controlling the addressable diffraction grating layer to form collimated light beams transmitting toward the photosensor respectively at different exit angles depending on a light exiting position on the addressable diffraction grating layer relative to the photosensor. Optionally, the photosensor has an area smaller than an area of the integrated photo-sensing detection display apparatus; and the photosensor is configured to detect fingerprint information generated from a touch at any portion of the counter substrate. Optionally, the method further includes controlling a first individually addressable diffraction region of the plurality of individually addressable diffraction regions to collimate light transmitted to the first individually addressable diffraction region to exit the first individually addressable diffraction region at a first exit angle toward the photosensor; and controlling a second individually addressable diffraction region of the plurality of individually addressable diffraction regions to collimate light transmitted to the second individually addressable diffraction region to exit the second individually addressable diffraction region at a second exit angle toward the photosensor. The second exit angle and the first exit angle are different from each other.

In some embodiments, the addressable diffraction grating layer includes a first electrode layer, a second electrode layer, and a liquid crystal layer between the first electrode layer and the second electrode layer. The first electrode layer and the second electrode layer in different individually addressable diffraction regions can be individually addressable, e.g., individually switched on or off. In some embodiments, the method further includes applying an electric field between the first electrode layer and the second electrode layer in a first individually addressable diffraction region, while applying no electric field in a second individually addressable diffraction region. Optionally, the method further includes forming plurality of liquid crystal lenses between the first electrode layer and the second electrode layer in the first individually addressable diffraction region to diffract light toward the photosensor at a first exit angle. Optionally, the method further includes adjusting the first exit angle based on the electric field applied between the first electrode layer and the second electrode layer in the first individually addressable diffraction region. In the second individually addressable diffraction region, no electric field is applied, and the liquid crystal layer does not form a plurality of liquid crystal lenses. Accordingly, substantially no light transmits through the second individually addressable diffraction region of the addressable diffraction grating layer.

In another aspect, the present disclosure provides a method of driving photo-sensing detection in an integrated photo-sensing detection display substrate. In some embodiments, the method includes selectively switching on at least a first individually addressable diffraction region to diffract a portion of the totally reflected light to the photosensor, and selectively switching off at least a second individually addressable diffraction region so that substantially no light transmitted through the second individually addressable diffraction region.

In another aspect, the present disclosure provides a method of fabricating an integrated photo-sensing detection display apparatus. In some embodiments, the method includes forming a counter substrate; and forming an array substrate facing the counter substrate. Optionally, the step of forming the array substrate includes forming a plurality of light emitting elements on a base substrate. Optionally, the plurality of light emitting elements are formed to emit light toward the counter substrate, a portion of the light being totally reflected by a surface of the counter substrate facing away the array substrate thereby forming totally reflected light. In some embodiments, the method further includes forming an addressable diffraction grating layer on a side of the base substrate away from the plurality of light emitting elements, the addressable diffraction grating layer formed to include a plurality of individually addressable diffraction regions; forming a grating layer driver circuit configured to independently control light diffraction respectively in the plurality of individually addressable diffraction regions; and forming a photosensor on a side of the addressable diffraction grating layer away from the base substrate, the photosensor formed to detect light transmitted from one or more of the plurality of individually addressable diffraction regions, thereby detecting fingerprint information.

In some embodiments, the method further includes forming a light shielding layer between the plurality of light emitting elements and the base substrate. The light shielding layer formed to block at least a portion of diffusedly reflected light from passing through. The light shielding layer is formed to have a light path aperture in the inter-subpixel region allowing at least a portion of the totally reflected light to pass through thereby forming a signal-enriched light beam. The addressable diffraction grating layer is formed to at least partially collimate the signal-enriched light beam thereby forming a collimated light beam; and the photosensor is formed to detect the collimated light beam, thereby detecting fingerprint information. Optionally, the light shielding layer has an area greater than an area of the subpixel region, and an orthographic projection of the light shielding layer on the base substrate covers an orthographic projection of the subpixel region on the base substrate.

In some embodiments, the step of forming the light shielding layer includes forming a plurality of light shielding blocks spaced apart from each other. Optionally, a respective one of the plurality of light shielding blocks is formed to be electrically connected to a drain electrode of a respective one of the plurality of thin film transistors for driving light emission of the plurality of light emitting elements. Optionally, the method further includes forming a first insulating layer between the drain electrode and the light shield layer. Optionally, a respective one of the plurality of light shielding blocks is formed to be electrically connected to a first electrode of a respective one of the plurality of light emitting elements. Optionally, the method further includes forming a second insulating layer between the first electrode and the light shield layer. Optionally, the second insulating layer is formed to extend into the light path aperture. Optionally, the first electrode is made of a substantially transparent conductive material.

In some embodiments, the method further includes forming a pixel definition layer defining a plurality of subpixel apertures. Optionally, the pixel definition layer is formed to have an inter-subpixel aperture in the inter-subpixel region allowing at least a portion of the totally reflected light to pass through sequentially the inter-subpixel aperture and the light path aperture. Optionally, the inter-subpixel aperture is larger than the light path aperture, and an orthographic projection of the light shielding layer on the base substrate covers an orthographic projection of the pixel definition layer on the base substrate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An integrated photo-sensing detection display substrate, comprising:
a base substrate;
a plurality of light emitting elements on the base substrate and configured to emit light, a portion of the light being totally reflected by a surface thereby forming totally reflected light;
an addressable grating layer on a side of the base substrate away from the plurality of light emitting elements, and comprising a plurality of individually addressable grating regions, light redirection diffraction respectively in the plurality of individually addressable grating regions being independently controllable;
a photosensor on a side of the addressable grating layer away from the base substrate and configured to detect light transmitted from one or more of the plurality of individually addressable grating regions, thereby detecting fingerprint information; and
a pixel definition layer defining a plurality of subpixel apertures;
wherein the integrated photo-sensing detection display substrate has a subpixel region and an inter-subpixel region;

the integrated photo-sensing detection display substrate further comprises a light shielding layer between the plurality of light emitting elements and the base substrate configured to block at least a portion of diffusedly reflected light from passing through, the light shielding layer having a light path aperture in the inter-subpixel region allowing at least a portion of the totally reflected light to pass through thereby forming a signal-enriched light beam;

the addressable grating layer is configured to redirect the signal-enriched light beam thereby forming a redirected light beam;

the photosensor is configured to detect the redirected light beam, thereby detecting fingerprint information;

the integrated photo-sensing detection display substrate comprises an inter-subpixel aperture in the inter-subpixel region and extending through the pixel definition layer, allowing at least a portion of the totally reflected light to pass through sequentially the inter-subpixel aperture and the light path aperture, the pixel definition layer being absent in the inter-subpixel aperture;

the inter-subpixel aperture is smaller than the light path aperture; and the inter-subpixel aperture forms a continuous network extending throughout an entirety of the integrated photo-sensing detection display substrate.

2. The integrated photo-sensing detection display substrate of claim 1, wherein the photosensor has an area smaller than an area of the integrated photo-sensing detection display substrate; and the addressable grating layer is configured to form light beams transmitting toward the photosensor respectively at different exit angles depending on a light exiting position on the addressable grating layer relative to the photosensor.

3. The integrated photo-sensing detection display substrate of claim 2, wherein the plurality of individually addressable grating regions comprises a first individually addressable grating region and a second individually addressable grating region;

the first individually addressable grating region is configured to redirect light transmitted to the first individually addressable grating region to exit the first individually addressable grating region at a first exit angle toward the photosensor;

the second individually addressable grating region is configured to redirect light transmitted to the second individually addressable grating region to exit the second individually addressable grating region at a second exit angle toward the photosensor; and the second exit angle and the first exit angle are different from each other.

4. The integrated photo-sensing detection display substrate of claim 3, wherein the first individually addressable grating region has a first grating pitch, the second individually addressable grating region has a second grating pitch, the first grating pitch is different from the second grating pitch.

5. The integrated photo-sensing detection display substrate of claim 3, wherein the first individually addressable grating region has a first refractive index, the second individually addressable grating region has a second refractive index, the first refractive index is different from the second refractive index.

6. The integrated photo-sensing detection display substrate of claim 1, wherein the light shielding layer has an area greater than an area of the subpixel region; and an orthographic projection of the light shielding layer on the base substrate covers an orthographic projection of the subpixel region on the base substrate.

7. The integrated photo-sensing detection display substrate of claim 6, further comprising a plurality of thin film transistors configured to drive light emission of the plurality of light emitting elements;

a respective one of the plurality of thin film transistors comprises a drain electrode;

the light shield layer comprises a plurality of light shielding blocks spaced apart from each other; and a respective one of the plurality of light shielding blocks is electrically connected to the drain electrode of a respective one of the plurality of thin film transistors.

8. The integrated photo-sensing detection display substrate of claim 7, further comprising a first insulating layer between the drain electrode and the light shield layer.

9. The integrated photo-sensing detection display substrate of claim 8, wherein a respective one of the plurality of light emitting elements comprises a first electrode electrically connected to the light shielding layer.

10. The integrated photo-sensing detection display substrate of claim 9, further comprising a second insulating layer between the first electrode and the light shield layer.

11. The integrated photo-sensing detection display substrate of claim 10, wherein the second insulating layer extends into the light path aperture.

12. The integrated photo-sensing detection display substrate of claim 9, wherein the first electrode is made of a substantially transparent conductive material.

13. The integrated photo-sensing detection display substrate of claim 1, wherein the inter-subpixel aperture is larger than the light path aperture; and an orthographic projection of the light shielding layer on the base substrate covers an orthographic projection of the pixel definition layer on the base substrate.

14. The integrated photo-sensing detection display substrate of claim 1, wherein the addressable grating layer is a nano-grating layer.

15. The integrated photo-sensing detection display substrate of claim 1, wherein the addressable grating layer is a liquid crystal grating layer.

16. The integrated photo-sensing detection display substrate of claim 1, further comprising a light collimating film at a side of the addressable grating layer away from the photosensor, and on a side of the base substrate away from the light shielding layer.

17. An integrated photo-sensing detection display apparatus, comprising:

the integrated photo-sensing detection display substrate of claim 1;

a counter substrate facing the integrated photo-sensing detection display substrate; and a grating layer driver circuit configured to independently control light redirection respectively in the plurality of individually addressable grating regions;

wherein the plurality of light emitting elements are configured to emit light toward the counter substrate, a portion of the light being totally reflected by a surface of the counter substrate facing away the integrated photo-sensing detection display substrate thereby forming the totally reflected light.

18. The integrated photo-sensing detection display apparatus of claim 17, wherein the grating layer driver circuit is configured to selectively switch on at least a first individually addressable grating region to redirect a portion of the totally reflected light to the photosensor, and selectively switch off at least a second individually addressable grating region so that substantially no light transmitted through the second individually addressable grating region.

19. The integrated photo-sensing detection display substrate of claim 1, wherein the addressable grating layer comprises a first individually addressable grating region having a first grating pitch in the first individually addressable grating region, a second individually addressable grating region having a second grating pitch in the second individually addressable grating region, and a third individually addressable grating region having a third grating pitch in the third individually addressable grating region;
  the second individually addressable grating region surrounds the first individually addressable grating region;
  the third individually addressable grating region surrounds the second individually addressable grating region;
  the first exit angle is greater than the second exit angle;
  the second exit angle is greater than the third exit angle;
  the first grating pitch is greater than the second grating pitch; and
  the second grating pitch is greater than the third grating pitch.

20. A method of driving photo-sensing detection in an integrated photo-sensing detection display substrate comprising a base substrate; a plurality of light emitting elements on the base substrate and configured to emit light, a portion of the light being totally reflected by a surface thereby forming totally reflected light; an addressable grating layer on a side of the base substrate away from the plurality of light emitting elements, and comprising a plurality of individually addressable grating regions, light redirection diffraction respectively in the plurality of individually addressable grating regions being independently controllable; a photosensor on a side of the addressable grating layer away from the base substrate and configured to detect light transmitted from one or more of the plurality of individually addressable grating regions, thereby detecting fingerprint information; and a pixel definition layer defining a plurality of subpixel apertures;
  wherein the integrated photo-sensing detection display substrate has a subpixel region and an inter-subpixel region;
  the integrated photo-sensing detection display substrate further comprises a light shielding layer between the plurality of light emitting elements and the base substrate configured to block at least a portion of diffusedly reflected light from passing through, the light shielding layer having a light path aperture in the inter-subpixel region allowing at least a portion of the totally reflected light to pass through thereby forming a signal-enriched light beam;
  the addressable grating layer is configured to redirect the signal-enriched light beam thereby forming a redirected light beam;
  the photosensor is configured to detect the redirected light beam, thereby detecting fingerprint information;
  the integrated photo-sensing detection display substrate comprises an inter-subpixel aperture in the inter-subpixel region and extending through the pixel definition layer, allowing at least a portion of the totally reflected light to pass through sequentially the inter-subpixel aperture and the light path aperture, the pixel definition layer being absent in the inter-subpixel aperture;
  the inter-subpixel aperture is smaller than the light path aperture; and
  the inter-subpixel aperture forms a continuous network extending throughout an entirety of the integrated photo-sensing detection display substrate;
  wherein the method comprises selectively switching on at least a first individually addressable grating region to redirect a portion of the totally reflected light to the photosensor, and selectively switching off at least a second individually addressable grating region so that substantially no light transmitted through the second individually addressable grating region.

\* \* \* \* \*